(12) United States Patent
Mou et al.

(10) Patent No.: US 10,801,637 B2
(45) Date of Patent: Oct. 13, 2020

(54) GAS TRANSPORTATION DEVICE

(71) Applicant: Microjet Technology Co., Ltd., Hsinchu (TW)

(72) Inventors: Hao-Jan Mou, Hsinchu (TW); Chi-Feng Huang, Hsinchu (TW); Hsuan-Kai Chen, Hsinchu (TW); Chang-Yen Tsai, Hsinchu (TW); Yung-Lung Han, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 211 days.

(21) Appl. No.: 16/104,252

(22) Filed: Aug. 17, 2018

(65) Prior Publication Data

US 2019/0085995 A1 Mar. 21, 2019

(30) Foreign Application Priority Data

Sep. 15, 2017 (TW) .............................. 106131781 A (51) Int. Cl.
*F04B 43/04* (2006.01)
*F04B 45/047* (2006.01)
(Continued)

(52) U.S. Cl.
CPC .......... *F16K 31/005* (2013.01); *F04B 43/046* (2013.01); *F04B 45/047* (2013.01);
(Continued)

(58) Field of Classification Search
CPC .... F04B 43/043; F04B 43/046; F04B 45/047; F04B 53/106; F16K 99/0015; F16K 99/0048; F16K 2099/0094
See application file for complete search history.

(56) References Cited

U.S. PATENT DOCUMENTS 5,176,358 A 1/1993 Bonne et al.
5,542,821 A 8/1996 Dugan
(Continued)

FOREIGN PATENT DOCUMENTS

CN 101682097 A 3/2010
CN 101986787 A 3/2011
(Continued)

OTHER PUBLICATIONS

Extended European Search Report, dated Oct. 23, 2018, for European Application No. 18189127.6.

*Primary Examiner* — Patrick Hamo
(74) *Attorney, Agent, or Firm* — Birch, Stewart, Kolasch & Birch, LLP (57) ABSTRACT

A gas transportation device includes an inlet plate, a substrate, a resonance plate, an actuating plate, a piezoelectric component and an outlet plate stacked sequentially. The gas transportation device includes a valve disposed within at least one of the inlet of the inlet plate and the outlet of the outlet plate. A first chamber is formed between the resonance plate and the actuating plate, and a second chamber is formed between the actuating plate and the outlet plate. When the piezoelectric component drives the actuating plate, a pressure gradient is formed between the first and second chambers and the valve is opened. Accordingly, gas is inhaled into the convergence chamber via the inlet, transported into the first chamber through a central aperture of the resonance plate, transported into the second chamber through a vacant space of the actuating plate, and then discharged out from the outlet, so as to transport the gas.

10 Claims, 8 Drawing Sheets

(51) Int. Cl.
*F16K 31/00* (2006.01)
*F16K 99/00* (2006.01)

(52) U.S. Cl.
CPC ........ *F16K 31/007* (2013.01); *F16K 99/0048* (2013.01); *F16K 2099/0082* (2013.01)

(56) References Cited

U.S. PATENT DOCUMENTS

| | | | |
|---|---|---|---|
| 8,646,479 B2 * | 2/2014 | Jaeb | F04B 43/046 |
| | | | 137/512.15 |
| 9,143,868 B2 | 9/2015 | Pinkerton et al. | |
| 9,353,740 B2 * | 5/2016 | Pinkerton | F04B 43/043 |
| 9,433,359 B2 * | 9/2016 | Sano | F04B 43/046 |
| 2004/0000843 A1 | 1/2004 | East | |
| 2006/0147329 A1 | 7/2006 | Tanner | |
| 2008/0245984 A1 | 10/2008 | Furukawa et al. | |
| 2011/0190670 A1 | 8/2011 | Jaeb et al. | |
| 2014/0271238 A1 | 9/2014 | Badger et al. | |
| 2015/0060012 A1 | 3/2015 | Kamitani et al. | |
| 2017/0222125 A1 * | 8/2017 | Chen | F04B 45/047 |

FOREIGN PATENT DOCUMENTS

| | | |
|---|---|---|
| CN | 102459899 A | 5/2012 |
| CN | 103968103 A | 8/2014 |
| CN | 104302913 A | 1/2015 |
| CN | 107076137 A | 8/2017 |
| EP | 3203081 A1 | 8/2017 |
| JP | 2002-106470 A | 4/2002 |
| WO | WO 2014-024608 A1 | 2/2014 |

* cited by examiner

GAS TRANSPORTATION DEVICE

FIELD OF THE INVENTION

The present disclosure relates to a gas transportation device, and more particularly to a gas transportation device having a valve for controlling the gas flow.

BACKGROUND OF THE INVENTION

Currently, in all fields, the products used in many sectors such as pharmaceutical industries, computer techniques, printing industries or energy industries are developed toward elaboration and miniaturization. The gas transportation devices are important components that are used in for example micro pumps, micro atomizers, printheads or the industrial printers. Therefore, how to utilize an innovative structure to break through the bottleneck of the prior art has become an important part of development.

With the rapid advancement of science and technology, the application of gas transportation device tends to be more and more diversified. For the industrial applications, the biomedical applications, the healthcare, the electronic cooling and so on, even the most popular wearable devices, the gas transportation device is utilized therein. It is obviously that the conventional gas transportation devices gradually tend to miniaturize the structure and maximize the flow rate thereof.

At present, although the miniature gas transportation device can be employed to transport gas continuously, it is difficult to improve the miniature gas transportation device to increase the amount of the transportation when it comes to its miniature chambers or flow channels with limited volume which have more design requirements. Therefore, there is a need of providing a gas transportation device to solve the above-mentioned drawbacks in prior arts.

SUMMARY OF THE INVENTION

An object of the present disclosure is to provide a gas transportation device. A valve is disposed within at least one of the inlet and the outlet for allowing the chambers with limited volume to accumulate the gas so as to increase the amount of output gas. By employing a designed valve in the gas transportation device, it can not only control the continuation or interruption of the gas transportation, but also control the gas to flow in single direction. In addition, the chambers and the flow channels with limited volume are used to accumulate the gas to increase the amount of gas to be discharged.

In accordance with an aspect of the present disclosure, there is provided a gas transportation device including an inlet plate, a substrate, a resonance plate, an actuating plate, a piezoelectric component, an outlet plate and at least one valve. The inlet plate includes at least one inlet. The resonance plate includes a central aperture. A convergence chamber is formed between the resonance plate and the inlet plate. The actuating plate includes a suspension part, an outer frame and at least one vacant space. The piezoelectric component is attached on a surface of the suspension part of the actuating plate. The outlet plate includes at least one outlet. The at least one valve is disposed within at least one of the inlet and the outlet. The inlet plate, the substrate, the resonance plate, the actuating plate, the piezoelectric component and the outlet plate are stacked sequentially, a gap between the resonance plate and the actuating plate is formed as a first chamber. A second chamber is formed between the actuating plate and the outlet plate. While the piezoelectric component drives the actuating plate to generate a bending vibration in resonance, a pressure gradient is formed between the first chamber and the second chamber, the at least one valve is opened, and gas is inhaled into the convergence chamber via the inlet of the inlet plate, transported into the first chamber through the central aperture of the resonance plate, transported into the second chamber through the at least one vacant space, and then discharged out from the outlet of the outlet plate, so as to transport the gas.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
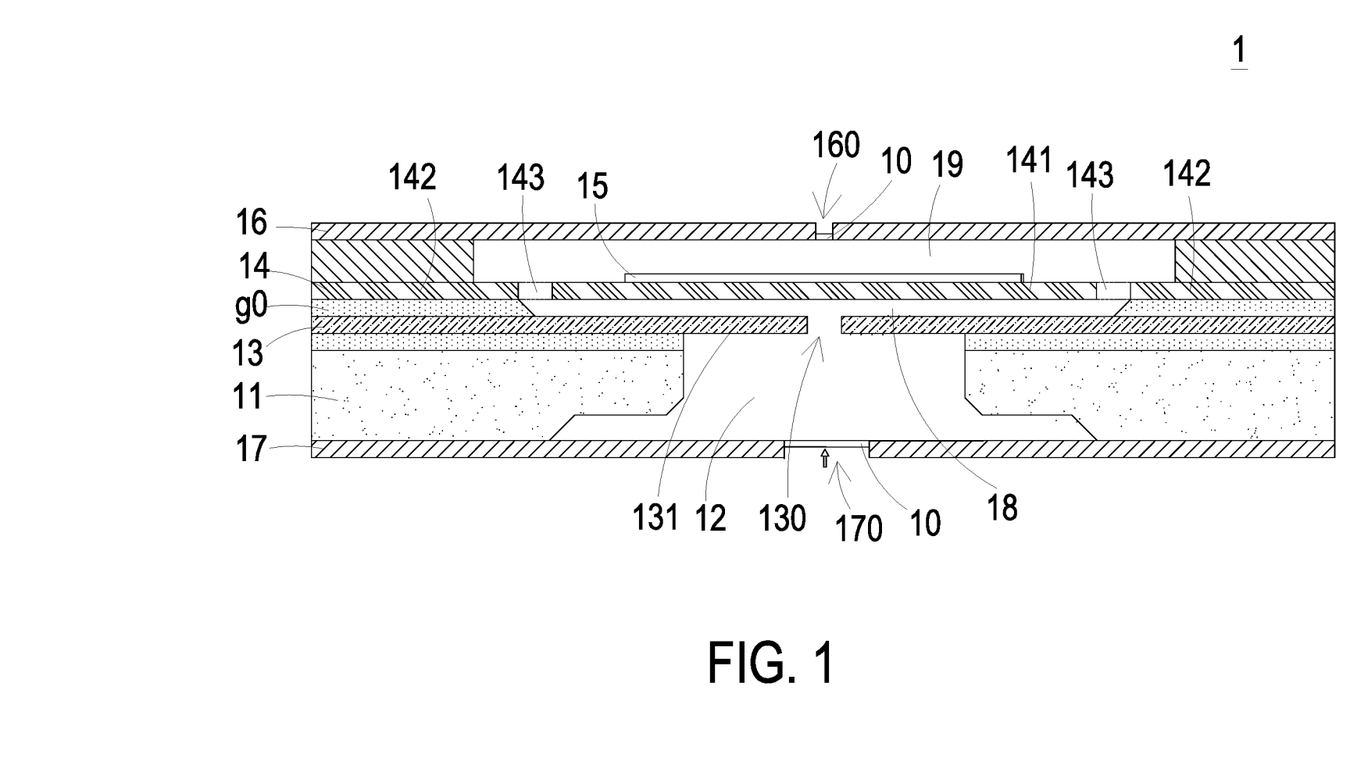
FIG. 1 is a schematic cross-sectional view illustrating a gas transportation device according to an embodiment of the present disclosure.

Please refer to FIG. 1. The present discourse provides a gas transportation device 1 including at least one inlet plate 17, at least one inlet 170, at least one substrate 11, at least one resonance plate 13, at least one central aperture 130, at least one convergence chamber 12, at least one actuating plate 14, at least one suspension part 141, at least one outer frame 142, at least one vacant space 143, at least one piezoelectric component 15, at least one outlet plate 16, at least one outlet 160, at least one valve 10, at least one gap g0, at least one first chamber 18, at least one second chamber 19 and at least one pressure gradient. The number of the inlet plate 17, the substrate 11, the resonance plate 13, the central aperture 130, the convergence chamber 12, the actuating plate 14, the suspension part 141, the outer frame 142, the piezoelectric component 15, the outlet plate 16, the outlet 160, the gap g0, the first chamber 18, the second chamber 19 and the pressure gradient is exemplified by one for each in the following embodiments but not limited thereto. It is noted that each of the inlet plate 17, the substrate 11, the resonance plate 13, the central aperture 130, the convergence chamber 12, the actuating plate 14, the suspension part 141, the outer frame 142, the piezoelectric component 15, the outlet plate 16, the outlet 160, the gap g0, the first chamber 18, the second chamber 19 and the pressure gradient can also be provided in plural numbers.

Please refer to FIG. 1, which is a schematic cross-sectional view illustrating a gas transportation device according to an embodiment of the present disclosure. In this embodiment, the gas transportation device 1 includes a substrate 11, a resonance plate 13, an actuating plate 14, a piezoelectric component 15 and an outlet plate 16, which are stacked sequentially to form a main body. An inlet plate 17 is employed to cover the bottom of the substrate 11 of the main body so as to assemble the gas transportation device 1. The substrate 11 may be a plate made of a silicon material or a graphene material. A convergence chamber 12 penetrating through the substrate 11 is formed by a semiconductor process. The inlet plate 17 covers the bottom of the substrate 11 and includes at least one inlet 170 spatially corresponding to and in communication with the convergence chamber 12. The resonance plate 13 may be a flexible plate. The resonance plate 13 is attached, stacked and fixed on the top of the substrate 11 and includes a central aperture 130 aligned with the convergence chamber 12. Except for a region of the resonance plate 13 directly attached above the substrate 11, the rest region of the resonance plate 13 is a suspension region which forms a movable part 131. The movable part 131 is subject to a bending deformation in response to a resonance frequency. The actuating plate 14 is a plate structure and includes a suspension part 141, an outer frame 142 and at least one vacant space 143. The suspension part 141 is connected to the outer frame 142 and located at a middle region of the actuating plate 14, so that the suspension part 141 is suspended and elastically supported by the outer frame 142. There are vacant spaces 143 formed at unconnected regions between the suspension part 141 and the outer frame 142. The outer frame 142 of the actuating plate 14 is attached, stacked and fixed on the resonance plate 13. A gap g0 is defined between the suspension part 141 and the resonance plate 13 so as to form a first chamber 18. The suspension part 141 may be any geometric shape. Preferably but not exclusively, the suspension part 141 is square. The piezoelectric component 15 is a plate structure made of a piezoelectric material and attached on a surface of the suspension part 141 of the actuating plate 14. The size of the piezoelectric component 15 is slightly smaller than that of the suspension part 141. The outlet plate 16 is attached and stacked on the outer frame 142 of the actuating plate 14 by a filler (e.g. Ea conductive adhesive), so that a second chamber 19 is formed between the outlet plate 16 and the actuating plate 14. The outlet plate 16 includes at least one outlet 160 in communication with the second chamber 19.

For the purpose of miniaturizing the gas transportation device 1 while increasing the amount of transportation that accumulates the gas by the chambers with limited volume, the gas transportation device 1 may further include at least one valve 10. The valve 10 may be disposed within one of the inlet 170 and the outlet 160 (or disposed both in the inlet 170 and the outlet 160) for accumulating the gas to increase the amount of gas to be discharged. The structure and operations of the valve 10 will be further described in the following.

Figure 2A:
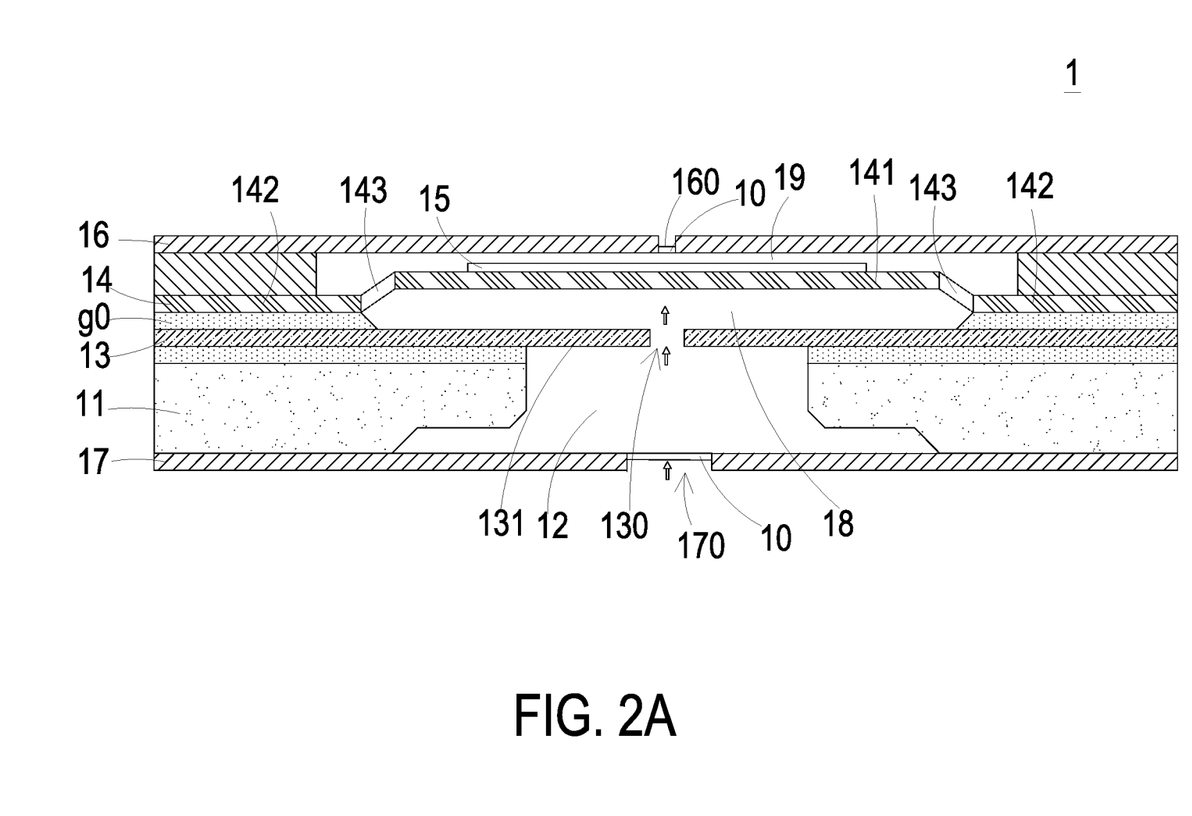
FIG. 2A to 2C are cross-sectional views illustrating processing operations of the gas transportation device of FIG. 1.
Figure 2B:
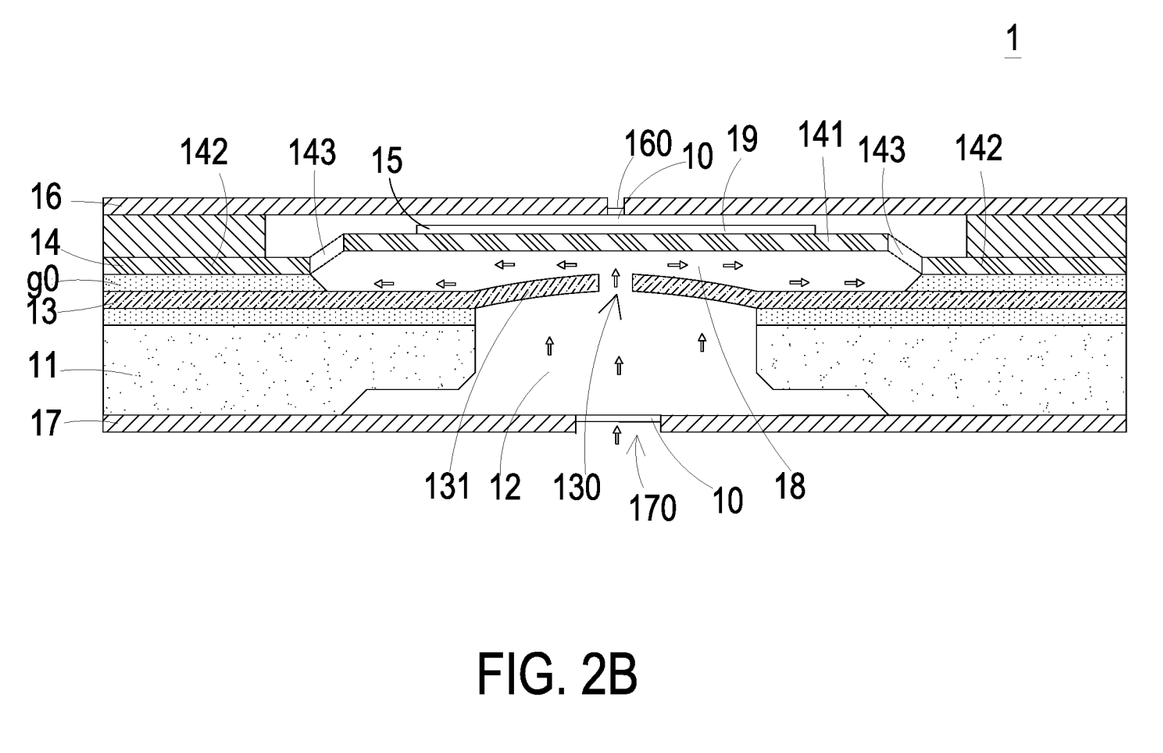
Figure 2C:
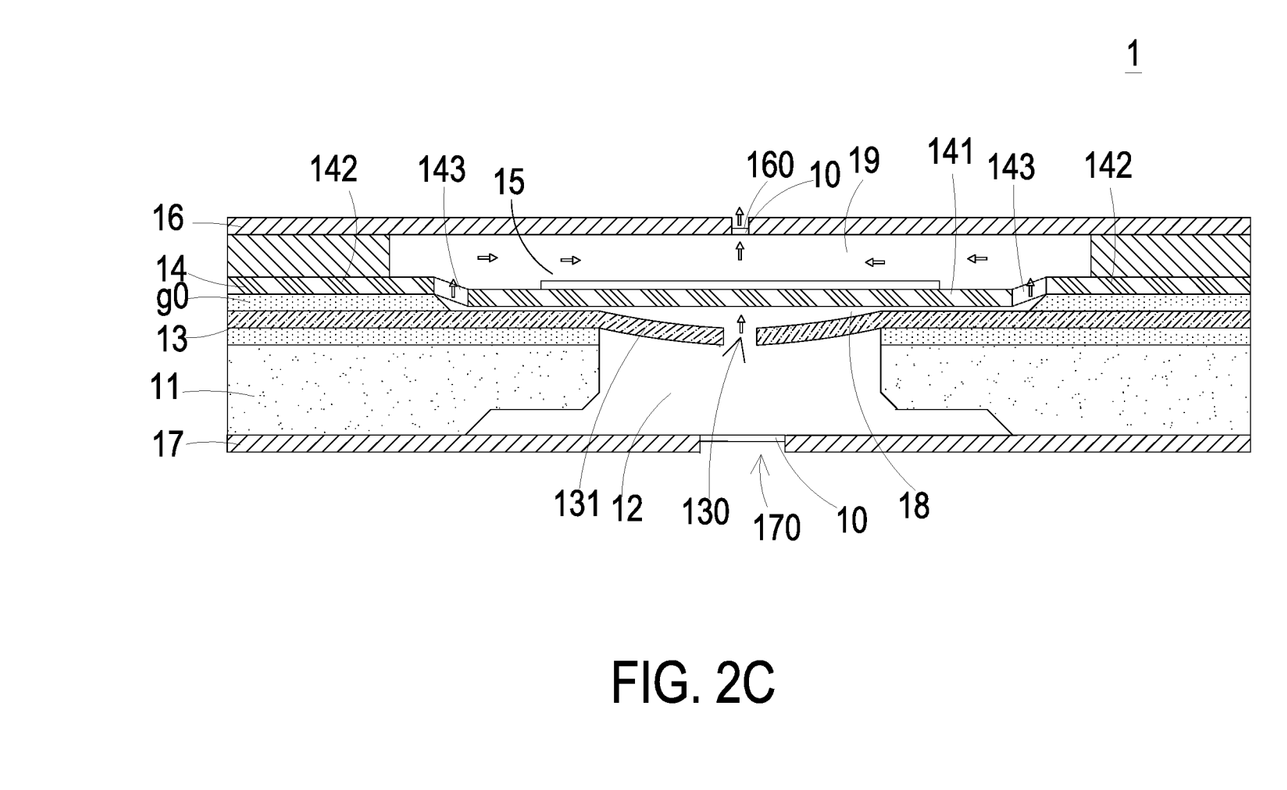

Please refer to FIGS. 2A to 2C, which are cross-sectional views illustrating processing operations of the gas transportation device of FIG. 1. When the piezoelectric component 15 of the gas transportation device 1 is enabled in response to a voltage to drive the actuating plate 14 to generate a bending vibration in resonance, the actuating plate 14 vibrates along a vertical direction in a reciprocating manner. As shown in FIG. 2A, when the actuating plate 14 vibrates upwardly, the volume of the first chamber 18 is enlarged and a suction force is generated accordingly for allowing the gas from an environment outside the gas transportation device 1 to be inhaled into the convergence chamber 12 via the inlet 170. Meanwhile, the gas in the second chamber 19 is compressed and discharged out via the outlet 160. As shown in FIG. 2B, when the vibration of the actuating plate 14 drives the resonance plate 13 to vibrate in resonance, the movable part 131 of the resonance plate 13 generates an upward deformation that allows the gas to flow into the first chamber 18 through the central aperture 130 of the resonance plate 13. Meanwhile, the gas is compressed and pushed toward a peripheral region of the first chamber 18. As shown in FIG. 2C, when the actuating plate 14 vibrates downwardly, the first chamber 18 is compressed to reduce the volume thereof so that the gas flows upwardly into the second chamber 19 through the vacant spaces 143. By repeating the operation illustrated in FIG. 2A, the gas in the second chamber 19 is compressed and discharged out via the outlet 160, so that the gas from the environment outside the gas transportation device 1 can be introduced into the convergence chamber 12 again. By repeating the operations of the gas transportation device 1 described above in FIGS. 2A to 2C, the gas transportation can be performed continuously.

Figure 3A:
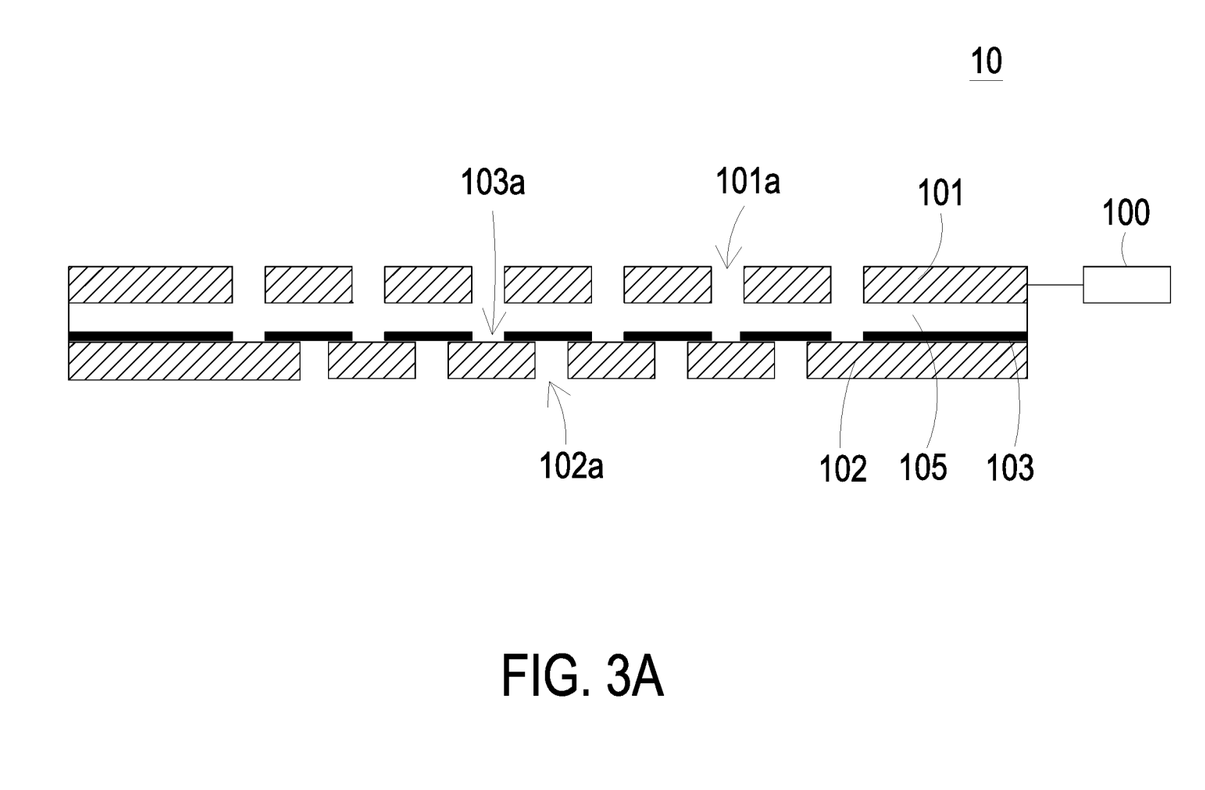
FIGS. 3A and 3B are cross-section views illustrating the operations of the valve according to first, second and third embodiments of the present disclosure.
Figure 3B:
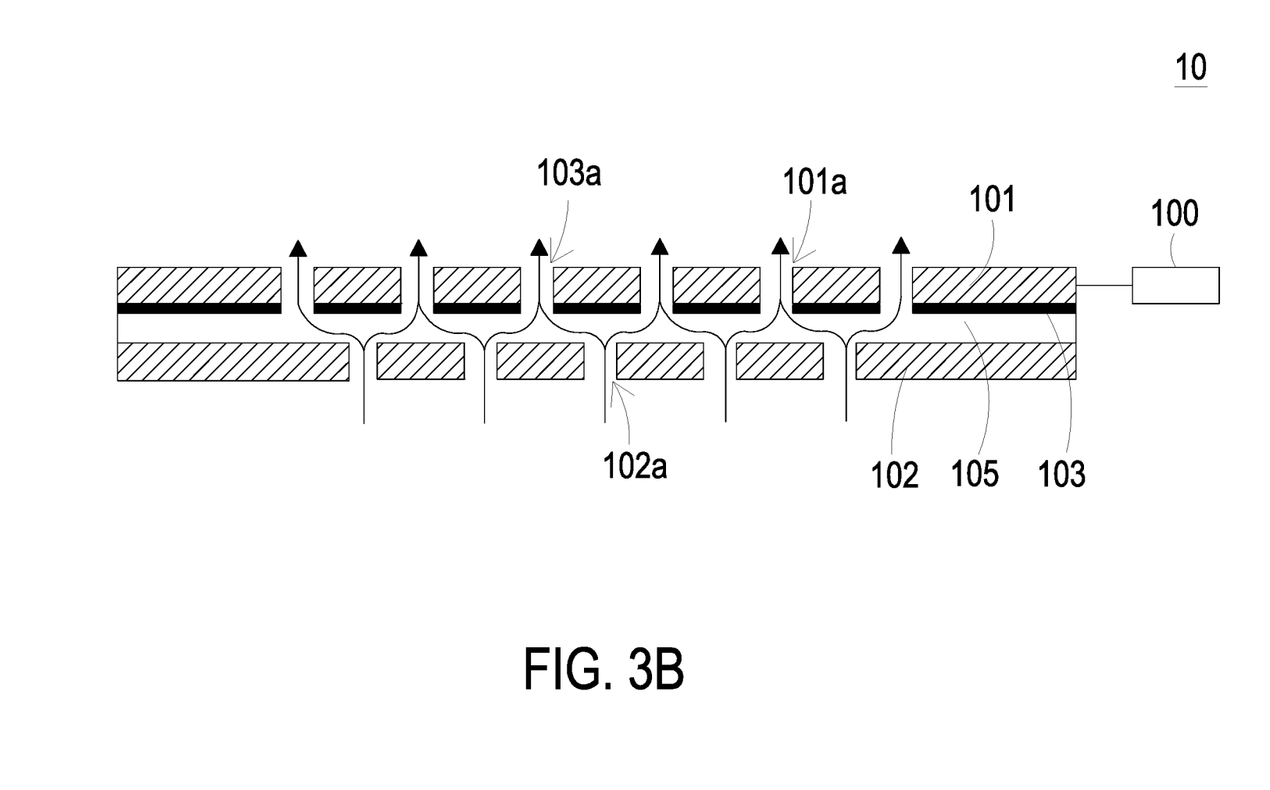

Please refer to FIGS. 3A and 3B, which are cross-section views illustrating the operations of the valve according to first, second and third embodiments of the present disclosure. As shown in FIG. 3A, in a first embodiment, the valve 10 includes a holding component 101, a sealing component 102 and a valve plate 103. In this embodiment, each of the holding component 101, the sealing component 102 and the valve plate 103 is made of a graphene material, but not limited thereto. The holding component 101 includes at least two orifices 101a. The valve plate 103 is disposed within an accommodation space 105 formed between the holding component 101 and the sealing component 102. The valve plate 103 includes at least two orifices 103a corresponding to the at least two orifices 101a of the holding component 101, respectively. More specifically, the at least two orifices 101a of the holding component 101 and the at least two orifices 103a of the valve plate 103 are aligned with each other, respectively. The sealing component 102 includes at least one orifice 102a. The at least one orifice 102a of the sealing component 102 is misaligned with the at least two orifices 101a of the holding component 101.

Please refer to FIGS. 1 to 3B. As shown in FIG. 3A, in the first embodiment, the valve 10 can be disposed within the inlet 170 of the inlet plate 17. While the gas transportation device 1 is enabled, the operations as illustrated in FIGS. 2A to 2C are performed and the gas is inhaled into the gas transportation device 1 via the inlet 170 of the inlet plate 17 continuously. At this time, a suction force is generated inside the gas transportation device 1 and the valve plate 103 is in a state as shown in FIG. 3B. A gas flow created by the suction force flows along the direction of the arrow and pushes the valve plate 103 upwardly. Consequently, the valve plate 103 is in close contact with the holding component 101 and the orifices 102a of the sealing component 102 is opened at the same time. Since the orifices 103a of the valve plate 103 are aligned with the orifices 101a of the holding component 101, respectively, the gas is inhaled through the orifices 102a of the sealing component 102 and further flows upwardly into the gas transportation device 1 through the communication between the orifices 103a of the valve plate 103 and the orifices 101a of the holding component 101. While the actuating plate 14 of the gas transportation device 1 vibrates downwardly, the first chamber 18 is compressed to reduce the volume thereof, so that the gas is transported upwardly into the second chamber 19 through the plurality of vacant spaces 143. Meanwhile, the valve plate 103 of the valve 10 is pushed by the gas to seal the orifices 102a of the sealing component 102, which returns back to the operation as shown in FIG. 3A. The operations described above make the gas flow in one direction, that is, the gas flows into the convergence chamber 12 and is accumulated in the convergence chamber 12 without flowing back. In this way, at the time when the actuating plate 14 of the gas transportation device 1 vibrates upwardly again, more gas is available for transportation and discharged out via the outlet 160, so as to increase the amount of the gas to be discharged.

In this embodiment, the valve plate 103, the sealing component 102 and the holding component 101 of the valve 10 are made of any suitable graphene material and formed a miniature valve. In the valve 10 according to a second embodiment, the valve plate 103 is made of a charged material. The holding component 101 is made of a bipolar conductive material. The holding component 101 is electrically connected to a control circuit 100. The control circuit 100 is used to change electrical polarity (positive polarity or negative polarity) of the holding component 101. In case that the valve plate 103 is made of a negatively charged material, while the valve 10 is required to be opened, the holding component 101 is in positive polarity in response to the control of the control circuit 100. Since the valve plate 103 and the holding component 101 are charged with opposite polarity, the valve plate 103 moves toward the holding component 101 so that the valve 10 is in an open state (as shown in FIG. 3B). Alternatively, in case that the valve plate 103 is made of the negatively charged material, while the valve 10 is required to be closed, the holding component 101 is in negative polarity in response to the control of the control circuit 100. Since the valve plate 103 and the holding component 101 are maintained in the same polarity, the valve plate 103 moves toward the sealing component 102 so that the valve 10 is in a closed state (as shown in FIG. 3A).

In the valve 10 according to a third embodiment, the valve plate 103 is made of a magnetic material. The holding component 101 is made of an electromagnet material. The holding component 101 is electrically connected to a control circuit 100. The control circuit 100 is used to change magnetic polarity (positive polarity or negative polarity) of the holding component 101. In case that the valve plate 103 is made of a magnetic material and has negative polarity, while the valve 10 is required to be opened, the holding component 101 is in positive polarity in response to the control of the control circuit 100. Since the valve plate 103 and the holding component 101 are maintained in opposite polarity, the valve plate 103 moves toward the holding component 101 so that the valve 10 is in the open state (as shown in FIG. 3B). Alternatively, in case that the valve plate 103 is made of the magnetic material and has negative polarity, while the valve 10 is required to be closed, the holding component 101 is in negative polarity in response to the control of the control circuit 100. Since the valve plate 103 and the holding component 101 are maintained in the same polarity, the valve plate 103 moves toward the sealing component 102 so that the valve 10 is in the closed state (as shown in FIG. 3A).

Figure 4A:
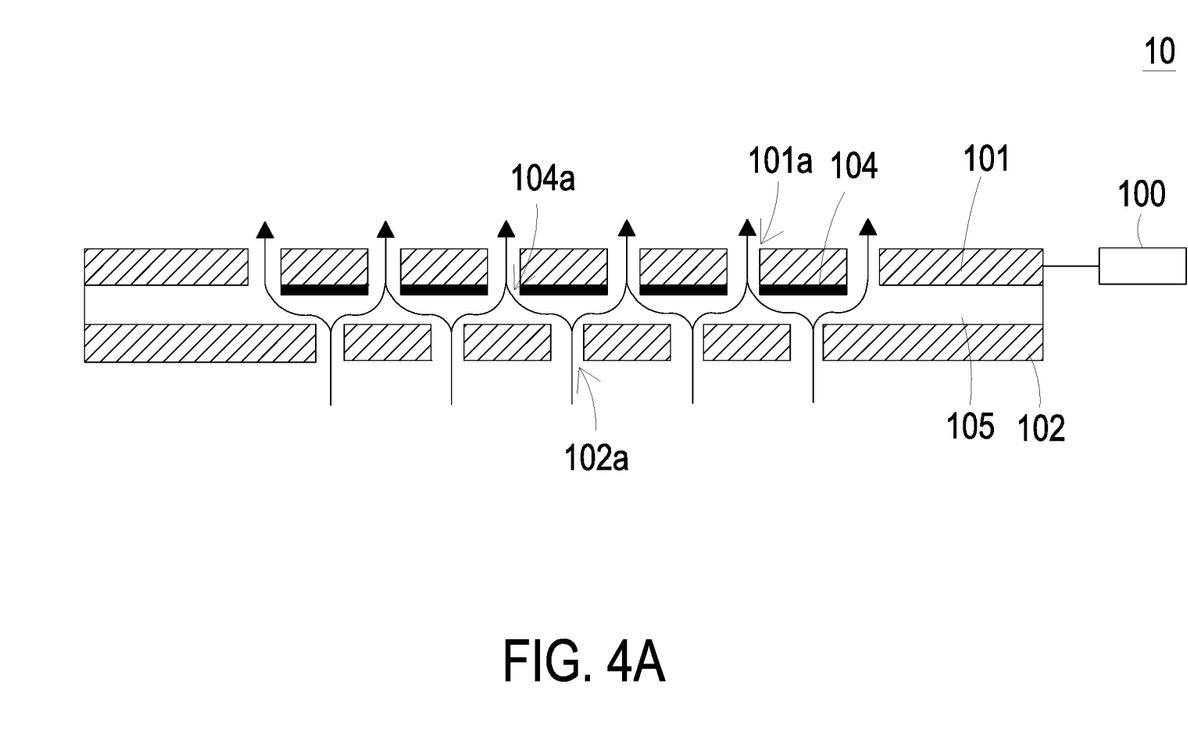
FIGS. 4A and 4B are cross-section views illustrating the operations of the valve according to fourth and fifth embodiments of the present disclosure.
Figure 4B:
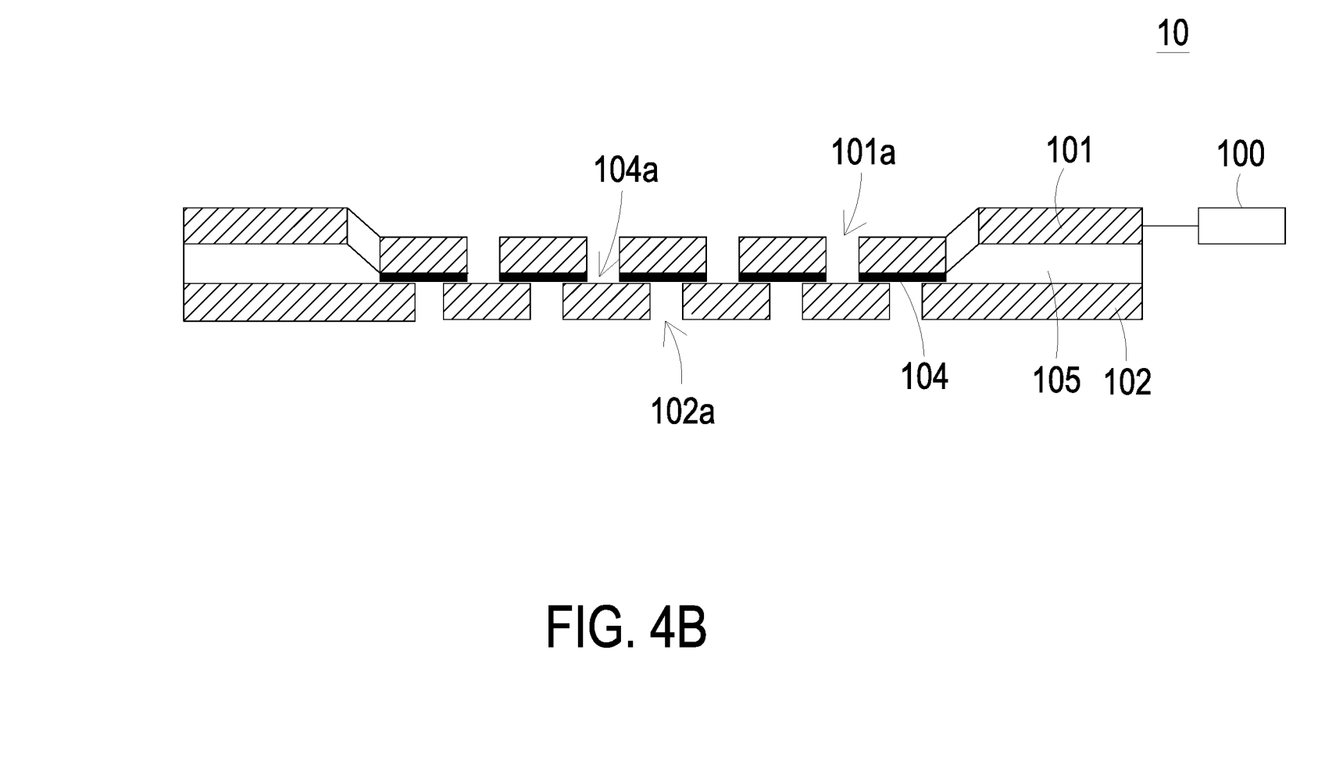

Please refer to FIGS. 4A and 4B, which are cross-section views illustrating the operations of the valve according to fourth and fifth embodiments of the present disclosure. As shown in FIG. 4A, in a fourth embodiment, the valve 10 includes a holding component 101, a sealing component 102 and a flexible membrane 104. The holding component 101 includes at least two orifices 101a. An accommodation space 105 is maintained between the holding component 101 and the sealing component 102. The flexible membrane 104 is made of a flexible material, attached on a surface of the holding component 101 and disposed within the accommodation space 105. The flexible membrane 104 includes at least two orifices 104a corresponding to the at least two orifices 101a of the holding component 101, respectively. More specifically, the at least two orifices 101a of the holding component 101 and the at least two orifices 104a of the flexible membrane 104 are aligned with each other, respectively. The sealing component 102 includes at least one orifice 102a. The orifice 102a of the sealing component 102 is misaligned with the at least two orifices 101a of the holding component 101.

Please refer to FIGS. 4A and 4B again. In the valve 10 according to the fourth embodiment, the holding component 101 is made of a thermal expansion material and electrically connected to a control circuit 100. The control circuit 100 is used to heat the holding component 101 and keep the temperature of the holding component 101 under control. While the valve 10 is required to be opened, the holding component 101 is free of thermal expansion in response to the control of the control circuit 100 and the accommodation space 105 between the holding component 101 and the sealing component 102 is maintained so that the valve 10 is in the open state (as shown in FIG. 4A). Alternatively, while the valve 10 is required to be closed, the holding component 101 is heated to expand it in response to the control of the control circuit 100 and thus moves into contact with the sealing component 102. Consequently, the flexible membrane 104 is in close contact with the at least one orifice 102a of sealing component 102 so that the valve 10 is in the closed state (as shown in FIG. 4B).

Please refer to FIGS. 4A and 4B again. In the valve 10 according to a fifth embodiment, the holding component 101 is made of a piezoelectric material and electrically connected to a control circuit 100. The control circuit 100 is used to control deformation of the holding component 101. When the valve 10 is required to be opened, the holding component 101 is free of deformation in response to the control of the control circuit 100 and the accommodation space 105 between the holding component 101 and the sealing component 102 is maintained so that the valve 10 is in the open state (as shown in FIG. 4A). Alternatively, while the valve 10 is required to be closed, the holding component 101 is deformed in response to the control of the control circuit 100 and thus moves into contact with the sealing component 102. Consequently, the flexible membrane 104 is in close contact with the at least one orifice 102a of the sealing component 102 so that the valve 10 is in the closed state (as shown in FIG. 4B). In addition, each of spacing blocks of the holding component 101, which is aligned with one orifice 102a of the sealing component 102, may be independently controlled by the control circuit 100. Therefore, transportation operations of an adjustable valve 10 may be provided, by which the amount of gas for transportation can be appropriately adjusted under control.

In summary, the present disclosure provides a gas transportation device. A valve is disposed within at least one of the inlet and the outlet for allowing the chambers with limited volume to accumulate the gas so as to increase the amount of gas to be discharged.

While the disclosure has been described in terms of what is presently considered to be the most practical and preferred embodiments, it is to be understood that the disclosure needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A gas transportation device comprising:
   an inlet plate having at least one inlet;
   a substrate;
   a resonance plate having a central aperture, wherein a convergence chamber is formed between the resonance plate and the inlet plate;
   an actuating plate having a suspension part, an outer frame and at least one vacant space;
   a piezoelectric component attached on a surface of the suspension part of the actuating plate;
   an outlet plate having at least one outlet; and
   at least one valve disposed within at least one of the inlet and the outlet,
   wherein the inlet plate, the substrate, the resonance plate, the actuating plate, the piezoelectric component and the outlet plate are stacked sequentially, a gap between the resonance plate and the actuating plate is formed as a first chamber, and a second chamber is formed between the actuating plate and the outlet plate, wherein while the piezoelectric component drives the actuating plate to generate a bending vibration in resonance, a pressure gradient is formed between the first chamber and the second chamber, and the at least one valve is opened, whereby gas is inhaled into the convergence chamber via the inlet of the inlet plate, transported into the first chamber through the central aperture of the resonance plate, transported into the second chamber through the at least one vacant space, and then discharged out from the outlet of the outlet plate, so as to transport the gas,
   wherein the at least one valve comprises a holding component, a sealing component and a valve plate, wherein an accommodation space is maintained between the holding component and the sealing component, and the valve plate is disposed within the accommodation space, wherein the holding component has at least two orifices and the valve plate has at least two orifices corresponding to the at least two orifices of the holding component that the at least two orifices of the holding component are aligned with the orifices of the valve plate, and wherein the sealing component has at least one orifice misaligned with the at least two orifices of the holding component,
   wherein the holding component is electrically connected to a control circuit, and the at least one valve is controlled to be opened or closed by the control circuit.

2. The gas transportation device according to claim 1, wherein the valve plate is made of a charged material, and the holding component is made of a bipolar conductive material and controlled by the control circuit to change electrical polarity thereof, wherein while the valve plate and the holding component are maintained in opposite polarity, the valve plate moves toward the holding component so that the valve is in an open state, and while the valve plate and the holding component are maintained in the same polarity, the valve plate moves toward the sealing component so that the valve is in a closed state.

3. The gas transportation device according to claim 1, wherein the valve plate is made of a magnetic material, and the holding component is made of an electromagnet material and controlled by the control circuit to change magnetic polarity thereof, wherein while the valve plate and the holding component are maintained in opposite polarity, the valve plate moves toward the holding component so that the valve is in an open state, and while the valve plate and the holding component are maintained in the same polarity, the valve plate moves toward the sealing component so that the valve is in a closed state.

4. The gas transportation device according to claim 1, wherein the holding component, the sealing component or the valve plate are made of a graphene material.

5. The gas transportation device according to claim 1, wherein the valve plate is made of a charged material, and the holding component is made of a bipolar conductive material and controlled by the control circuit to change electrical polarity thereof, wherein while the valve plate and the holding component are maintained in opposite polarity, the valve plate moves toward the holding component so that the valve is in an open state, and while the valve plate and the holding component are maintained in the same polarity, the valve plate moves toward the sealing component so that the valve is in a closed state.

6. The gas transportation device according to claim 1, wherein the valve plate is made of a magnetic material, and the holding component is made of an electromagnet material and controlled by the control circuit to change magnetic polarity thereof, wherein while the valve plate and the holding component are maintained in opposite polarity, the valve plate moves toward the holding component so that the valve is in an open state, and while the valve plate and the holding component are maintained in the same polarity, the valve plate moves toward the sealing component so that the valve is in a closed state.

7. The gas transportation device according to claim 1, wherein the valve plate is a flexible membrane, and the flexible membrane is attached on a surface of the holding component.

8. The gas transportation device according to claim 7, wherein the holding component is made of a thermal expansion material and controlled by the control circuit for heating thereof, wherein while the holding component is heated and expanded, the flexible membrane moves toward and contacts the sealing component so as to seal the at least one orifice of the sealing component, so that the valve is in a closed state, and while the holding component is free of thermal expansion, the accommodation space between the sealing component and the holding component is maintained so that the valve is in an open state.

9. The gas transportation device according to claim 7, wherein the holding component is made of a piezoelectric material and controlled by the control circuit for deforming thereof, wherein while the holding component is deformed, the flexible membrane moves toward and contacts the sealing component so as to seal the at least one orifice of the sealing component, so that the valve is in a closed state, and while the holding component is free of deformation, the accommodation space between the sealing component and the holding component is maintained so that the valve is in an open state.

10. A gas transportation device comprising:
    at least one inlet plate having at least one inlet;
    at least one substrate;
    at least one resonance plate having at least one central aperture, wherein at least one convergence chamber is formed between the resonance plate and the inlet plate;
    at least one actuating plate having at least one suspension part, at least one outer frame and at least one vacant space;

at least one piezoelectric component attached on a surface of the suspension part of the actuating plate;

at least one outlet plate having at least one outlet; and at least one valve disposed within at least one of the inlet and the outlet, wherein the inlet plate, the substrate, the resonance plate, the actuating plate, the piezoelectric component and the outlet plate are stacked sequentially, at least one gap between the resonance plate and the actuating plate is formed as at least one first chamber, and at least one second chamber is formed between the actuating plate and the outlet plate, wherein while the piezoelectric component drives the actuating plate to generate a bending vibration in resonance, at least one pressure gradient is formed between the first chamber and the second chamber, and the at least one valve is opened, whereby gas is inhaled into the convergence chamber via the inlet of the inlet plate, transported into the first chamber through the central aperture of the resonance plate, transported into the second chamber through the at least one vacant space, and then discharged out from the outlet of the outlet plate, so as to transport the gas, wherein the at least one valve comprises a holding component, a sealing component and a valve plate, wherein an accommodation space is maintained between the holding component and the sealing component, and the valve plate is disposed within the accommodation space, wherein the holding component has at least two orifices and the valve plate has at least two orifices corresponding to the at least two orifices of the holding component that the at least two orifices of the holding component are aligned with the orifices of the valve plate, and wherein the sealing component has at least one orifice misaligned with the at least two orifices of the holding component, wherein the holding component is electrically connected to a control circuit, and the at least one valve is controlled to be opened or closed by the control circuit.

* * * * *